Patented July 12, 1932

1,867,306

UNITED STATES PATENT OFFICE

GLEN HARVEY BURGMAN, OF CHICAGO, ILLINOIS

FLAT VARNISH

No Drawing.    Application filed June 3, 1929.  Serial No. 368,192.

My invention relates to varnishes and particularly to a novel flat varnish having unusual properties.

While there are a number of flat varnishes on the market that lend themselves to different applications, none thereof possess the novel and useful properties of the one hereafter described in detail.

Upon the inspection of a surface that has been coated with an ordinary flat varnish with a microscope, one will note any number of tiny pores and pinholes, demonstrating that these varnishes cover the surfaces something like a microscopic net-work. There is no continuous film set up and for this reason the surface assumes an apparent flat surface which differs radically from the ordinary glossy varnish.

The varnish composition that I have invented, while it contains a number of ingredients that are common to all flat varnishes, yet the properties of these ingredients and the process of combination gives my varnish properties that differ from the usual flat varnish, viz., it acts simultaneously as a glazing liquid. My varnish can be used in its transparent state, or it may be opacified by the addition of pigment. In either event, it presents such highly desirable properties as drying in from one to three hours; is absolutely non-sagable; dries to a flat velvety finish, lending a starch-like effect to the coated surface; the surface is washable within forty-eight hours after application; can be applied to wood, metal, plaster or wallboard surfaces with the pleasing and advantageous results, which can be enhanced to a degree by the skill of the artisan making the application. Thus while there are quite a number of so-called glazing liquids on the market, none are satisfactory for the reason that they lack one or more of the advantages exhibited by mine, such as their slower drying time, their relatively pervious surface, and other points that are well known to the using trade. My particular invention is the only "glazing liquid" that reacts perfectly to all the exacting requirements for this particular type of material. As an instance of its efficiency, should an excess be brushed on the surface, the excess may be rubbed off with a rag to the desired quantity, leaving the resulting job altogether satisfactory.

The solid base of my product consists in a solid fatty acid salt of one of the heavier metals like calcium, barium, magnesium, or aluminum stearate, palmitate, etc. In other words, I use any hard salt of a heavy metal and a fatty acid, and for purposes of tinting this base product, I utilize the copper, iron, and other solid fatty acid salts that lend color.

As pigment material for opacifying the product, I use chalk, barium carbonate, magnesium carbonate, gypsum, etc., while as color pigment materials I use ochre, ultramarine blue, etc.

The liquid base of my product consists in refined linseed oil, or any other drying oil that will serve this end, such as Chinawood oil, perilla oil etc. This oil may be used in combination with a dryer, or the dryer may be subsequently added. In combination with this drying oil I use small portions of hard fusible resinous materials, such as commercial rosin, cumar etc.

The product is diluted with mineral oil of the kerosene fraction, and is thinned with naphthas of various gravities, depending upon the particular usage, or with a combination of high and low flash naphthas.

The total solid content of my material ranges between 15 and 30%. The total drying oil content of my product also ranges between 15 and 30%, but the total solid and oil composition of my product taken together never exceeds 50% of the finished product. The balance of the product consists in from 33⅓ to 40% of a kerosene oil of about 40° Bé., which is very essential, and the remaining 10 to 15% of a mixture of high and low flash naphtha.

The compounding of my varnish may be accomplished in a number of ways, such as by the direct solution of the solid matter in the linseed oil, with or without a small amount of Chinawood oil, to which is then added the mineral oil, and finally the thinners. It can also be prepared by using varnishes previously prepared, and subsequent thinning and diluting the same. As an example of the preparation of a representative batch, I dissolve about 100 pounds of aluminum stearate in 60 pounds of refined linseed oil, with which I mix 50 pounds of magnesium carbonate. To this mixture, I then add about 10 pounds of a varnish consisting of rosin dissolved in wood oil and diluted with a thinner, and 80 pounds of a varnish consisting of rosin dissolved in linseed oil and thinned with high flash naphtha. To this mixture I add about 175 pounds of mineral oil of 40° Bé., and from 5 to 10 pounds of japan dryer depending upon the particular use intended.

Another example is as follows: 2 to 5% of a solid salt of a fatty acid and a heavy metal, such as aluminum stearate, 15 to 25% of a pigment and filler such as magnesium carbonate, 5% of a hard fusible rosin, 25 to 50% of 40 Bé. kerosene, together with the necessary thinner and dryer.

The aforesaid, I believe thoroughly illustrates the principles and technique involved in my invention, and wish it to be considered as such.

I claim:

A composition of matter that will form a glazed surface composed of 15 to 30% by weight of drying oils, 15 to 30% solids, comprising metallic soaps of fatty acids pigments, the quantity of solids and drying oils not to exceed 50% of the total ingredients, the balance of the composition of matter, being not less than 50% of the total weight, consisting of from 33⅓ to 40% of a kerosene oil of about 40 Bé., and the remaining 16⅔ to 10% consisting of a mixture of high and low boiling naphtha.

In testimony whereof I have affixed my signature.

GLEN HARVEY BURGMAN.